United States Patent
Curtis-Maury et al.

(10) Patent No.: US 12,066,897 B2
(45) Date of Patent: Aug. 20, 2024

(54) PERSISTENT MEMORY FILE SYSTEM RECONCILIATION

(71) Applicant: NetApp Inc., San Jose, CA (US)

(72) Inventors: Matthew Fontaine Curtis-Maury, Apex, NC (US); Ram Kesavan, Los Altos, CA (US); Ananthan Subramanian, San Ramon, CA (US); Abdul Basit, Morrisville, NC (US); Vinay Devadas, Apex, NC (US); Yash Hetal Trivedi, Cary, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/302,212

(22) Filed: Apr. 18, 2023

(65) Prior Publication Data

US 2023/0251932 A1  Aug. 10, 2023

Related U.S. Application Data

(62) Division of application No. 17/018,176, filed on Sep. 11, 2020, now Pat. No. 11,630,733.

(51) Int. Cl.
| | |
|---|---|
| *G06F 11/00* | (2006.01) |
| *G06F 11/14* | (2006.01) |
| *G06F 13/16* | (2006.01) |
| *G06F 16/182* | (2019.01) |

(52) U.S. Cl.
CPC ...... *G06F 11/1435* (2013.01); *G06F 13/1668* (2013.01); *G06F 16/183* (2019.01)

(58) Field of Classification Search
CPC ............. G06F 11/1435; G06F 11/1451; G06F 11/2058; G06F 11/2097; G06F 2201/84
See application file for complete search history.

(56) References Cited

U.S. PATENT DOCUMENTS

| | | | |
|---|---|---|---|
| 7,552,148 B2 | 6/2009 | Liu et al. | |
| 8,914,344 B1 | 12/2014 | Anderson et al. | |
| 10,635,552 B1 * | 4/2020 | Raju | .................... G06F 16/1865 |
| 11,210,184 B1 | 12/2021 | Gupta et al. | |
| 11,418,555 B1 * | 8/2022 | Cafaro | .................... H04L 65/61 |
| 11,630,733 B2 | 4/2023 | Curtis-Maury et al. | |
| 2009/0182790 A1 * | 7/2009 | Hluchyj | ............. H04N 21/2182 |
| | | | 710/33 |
| 2016/0034370 A1 * | 2/2016 | Nanduri | .................. G06F 3/065 |
| | | | 714/6.22 |
| 2016/0062856 A1 * | 3/2016 | Mu | ...................... G06F 11/2092 |
| | | | 714/4.12 |

(Continued)

*Primary Examiner* — Amine Riad
(74) *Attorney, Agent, or Firm* — Cooper Legal Group, LLC

(57) ABSTRACT

Techniques are provided for persistent memory file system reconciliation. As part of the persistent memory file system reconciliation, high level file system metadata associated with a persistent memory file system of persistent memory is reconciled. Client access to the persistent memory file system is inaccessible until reconciliation of the high level file system metadata has completed. A first scanner is executed to traverse pages of the persistent memory in order to fix local inconsistencies associated with the pages. A local inconsistency of a first set of metadata or data of a page is fixed using a second set of metadata or data of the page. The first scanner is executed asynchronously in parallel with processing client I/O directed to the persistent memory file system.

20 Claims, 13 Drawing Sheets

(56) References Cited

U.S. PATENT DOCUMENTS

2016/0124812 A1\* 5/2016 Sarkar ................ G06F 11/1435
   711/162
2016/0342479 A1 11/2016 Chen et al.
2021/0073088 A1\* 3/2021 Dharmadhikari ..... G06F 3/0683

\* cited by examiner

PERSISTENT MEMORY FILE SYSTEM RECONCILIATION

RELATED APPLICATIONS

This application claims priority to and is a divisional of U.S. application Ser. No. 17/018,176, filed on Sep. 11, 2020, now allowed, titled "PERSISTENT MEMORY ARCHITECTURE," which is incorporated herein by reference.

BACKGROUND

A node, such as a server, a computing device, a virtual machine, etc., may utilize persistent memory to store and organize data and metadata through a persistent memory file system. The persistent memory may provide relatively faster access and lower latency than other storage, such as cloud storage, disk drives, solid state drives, etc. When a set of actions are transmitted from the node to the persistent memory for persisting data into pages of the persistent memory, the set of actions may be performed by the persistent memory in any order. That is, the persistent memory does not guarantee an order with which the actions will be executed, and thus there is no guarantee as to the order with which data is persistent into the pages of the persistent memory.

Accordingly, if the node experiences a failure when the set of actions is pending at the persistent memory, the persistent memory can be left in an inconsistent state after the node recovers from the failure. For example, the set of actions may comprise a first write action to write data to a page and a second write action to update a checksum for the page based upon the data written to the page. If the node fails before the persistent memory has successful completed the set of actions, then an inconsistent state can occur where only one of the write actions successfully completed, such as where the data was written to the page but the checksum was not updated with the correct value or the checksum was updated but the data was never written to the page. Once the node reboots and recovers from the failure, the inconsistent state can cause program errors, memory leaks, lost data, and/or other operational issues.

DETAILED DESCRIPTION

Figure 1:
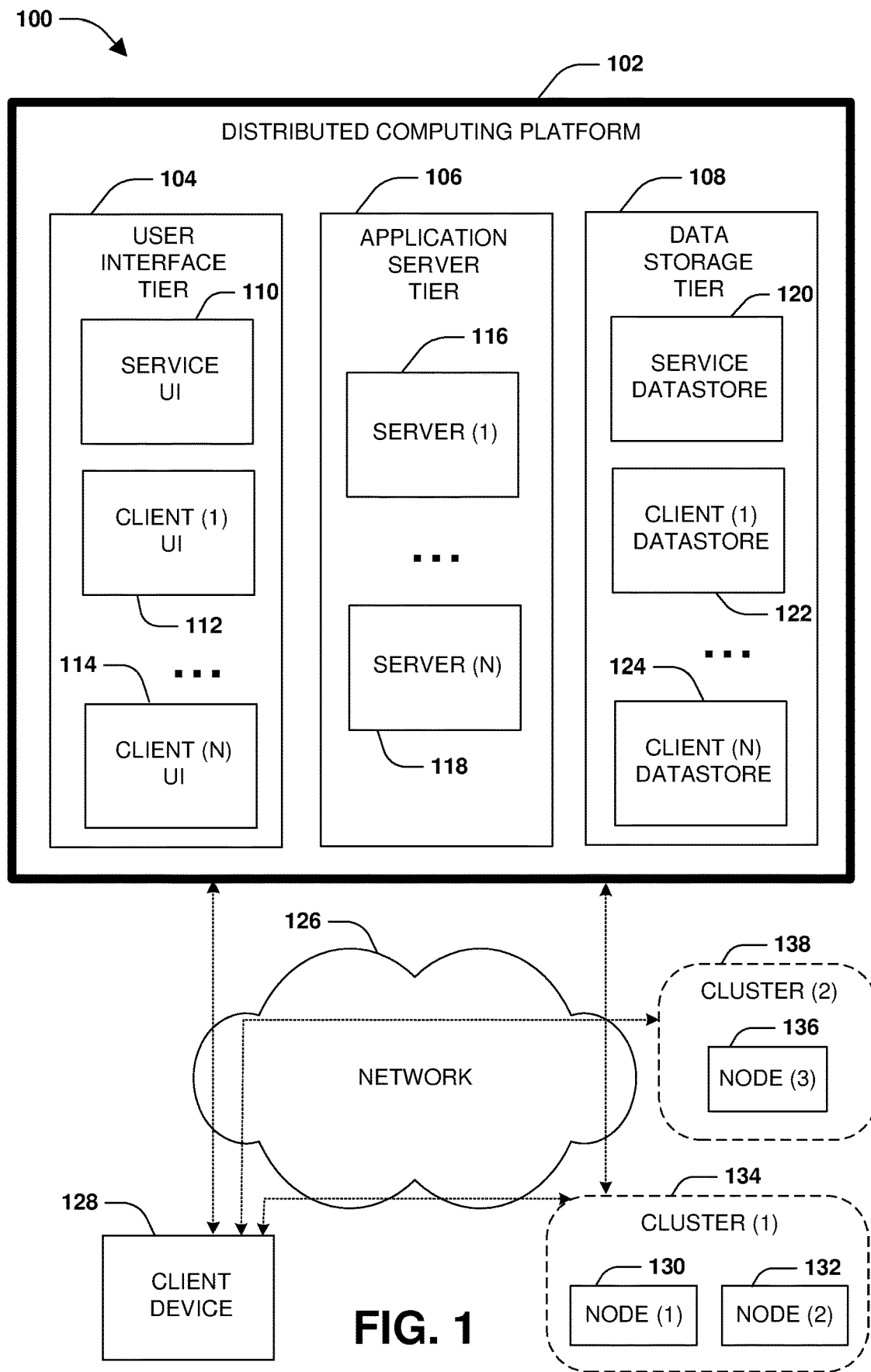
FIG. 1 is a block diagram illustrating an example computing environment in which an embodiment of the invention may be implemented.

The techniques described herein are directed to reconciling a persistent memory file system of persistent memory after a failure in order to reconstruct a consistent state of the persistent memory. In particular, when the persistent memory file system crashes due to the failure, an inconsistent state of the persistent memory may occur because some, none, or all pending operations may have completed at the time of crashing. The inconsistent state can occur because the persistent memory can persist operations (e.g., data of write operations) out of program order, and thus there is no way to tell what pending operations were completed and what pending operations did not complete. This is because the persistent memory does not guarantee a particular order of persisting operations.

As provided herein, a reconciliation process is performed to fix inconsistencies in the persistent memory in order to reconstruct the consistent state of the persistent memory. Otherwise, data loss, program errors, memory leaks, and client exposure to inconsistent/corrupt data could occur. The reconciliation process initially corrects high level file system metadata while client access to the persistent memory system is blocked. The high level file system metadata can be reconciled in a short amount of time (e.g., within a few seconds or less), and thus clients will experience little to no downtime from being able to access data stored within the persistent memory. Once the high level file system metadata is reconciled, client access to the persistent memory system is allowed.

As part of the reconciliation process, a first scanner and a second scanner are executed to fix local inconsistencies and global inconsistencies within the persistent memory. The scanners are executed asynchronously with the processing of client I/O (e.g., executed while client I/O operations are being processed), which allows for the persistent memory to be used to meet high availability performance requirements without exposing client devices to inconsistencies. If a client I/O operation targets a page that has not yet been checked/fixed by both scanners, then whatever scanners have not yet checked the page are executed on-demand upon the page in-line with processing the client I/O operation so that the client I/O operation can still execute without being blocked. In this way, the consistent state of the persistent memory file system is reconstructed in a manner that does not expose client devices to inconsistencies and reduces client downtime and latency that would otherwise occur if client access was blocked until the scanners have completed.

Prior techniques for reconciling storage are unable to recover a consistent state of persistent memory because such techniques are unable to reconcile inconsistencies that occur in relation to persistent memory due to persistent memory not guaranteeing an order with which operations will persist to the persistent memory. Furthermore, many techniques for reconciling storage may utilize software level barriers and/or block client I/O until a full reconciliation is complete, which results in unacceptable client downtime that can lead to programs timing out, data loss, perform degradation, increased latency, etc. If client access is allowed before the full reconciliation, then the clients could be exposed to inconsistencies, which can lead to program errors and other issue. In contrast to these prior techniques, various embodiments of the present invention are capable of reconciling persistent memory into a consistent state without undo client downtime or unacceptable increased latency.

Various embodiments of the present technology provide for a wide range of technical effects, advantages, and/or improvements to computing systems and components. For example, various embodiments include one or more of the following technical effects, advantages, and/or improvements: 1) the ability to reconcile persistent memory into a consistent state after a failure even though the persistent memory can persist operations in any order; 2) minimize client downtime and reduce client latency by merely reconciling high level file system metadata while client access to the persistent memory is inaccessible; 3) improve high availability performance by allowing client I/O while scanners are executing to fix local and global inconsistencies; and/or 4) reduce client latency during execution of the scanners by on-demand executing the scanners in-line with processing a client I/O operation directed to a page not yet evaluated by the scanners instead of blocking or queuing the client I/O operation.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of a on-premise, cloud-based, or hybrid storage solution.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
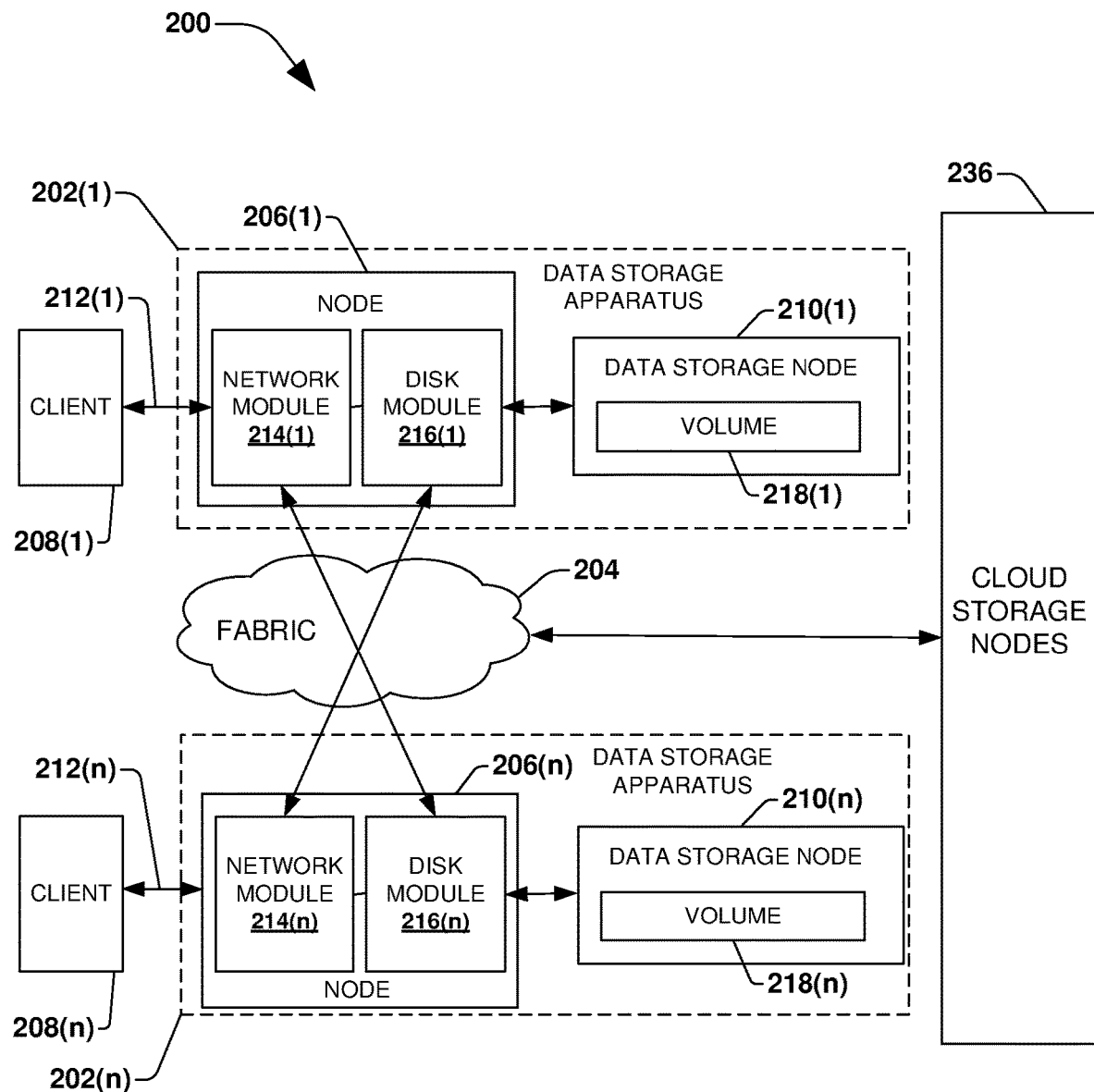
FIG. 2 is a block diagram illustrating an example of a network environment with exemplary nodes in accordance with an embodiment of the invention.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
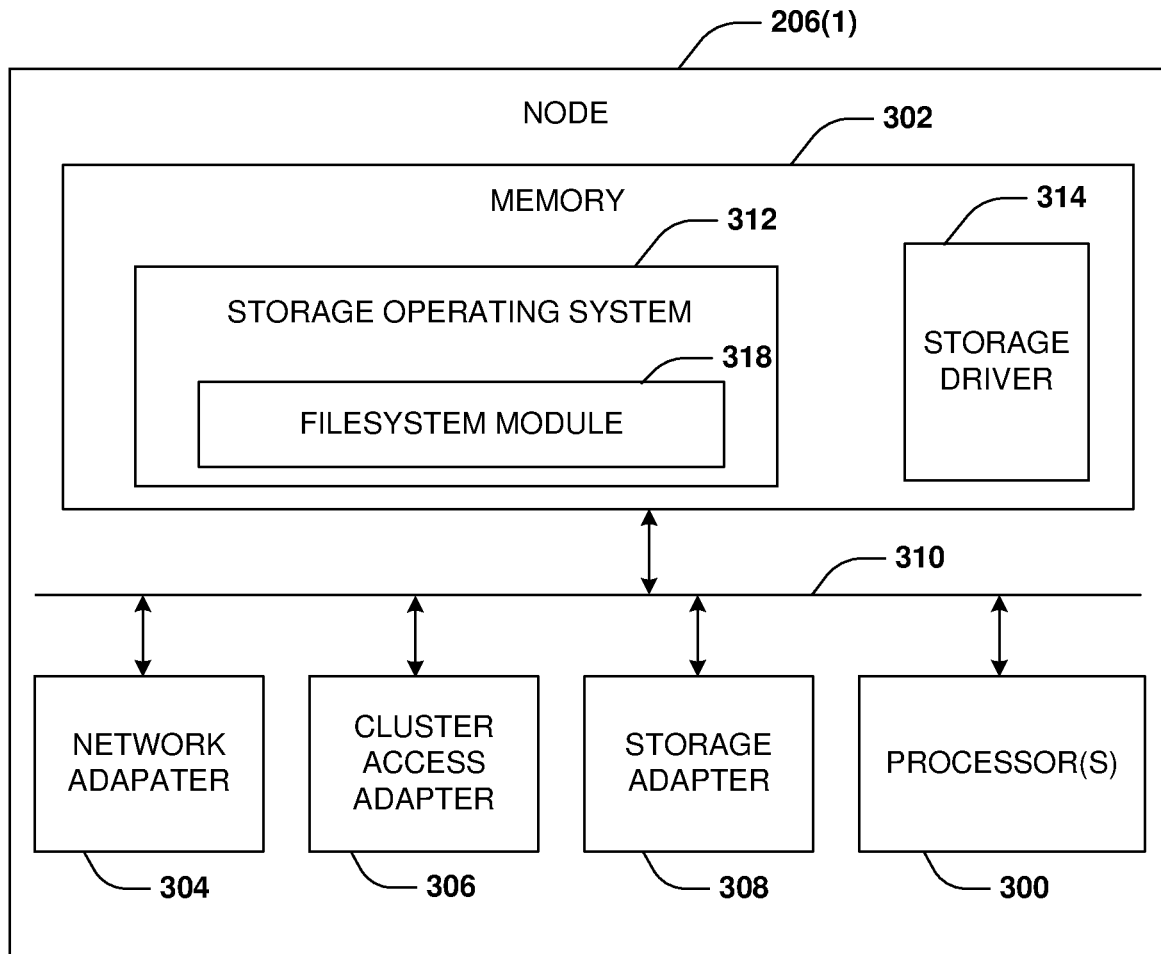
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
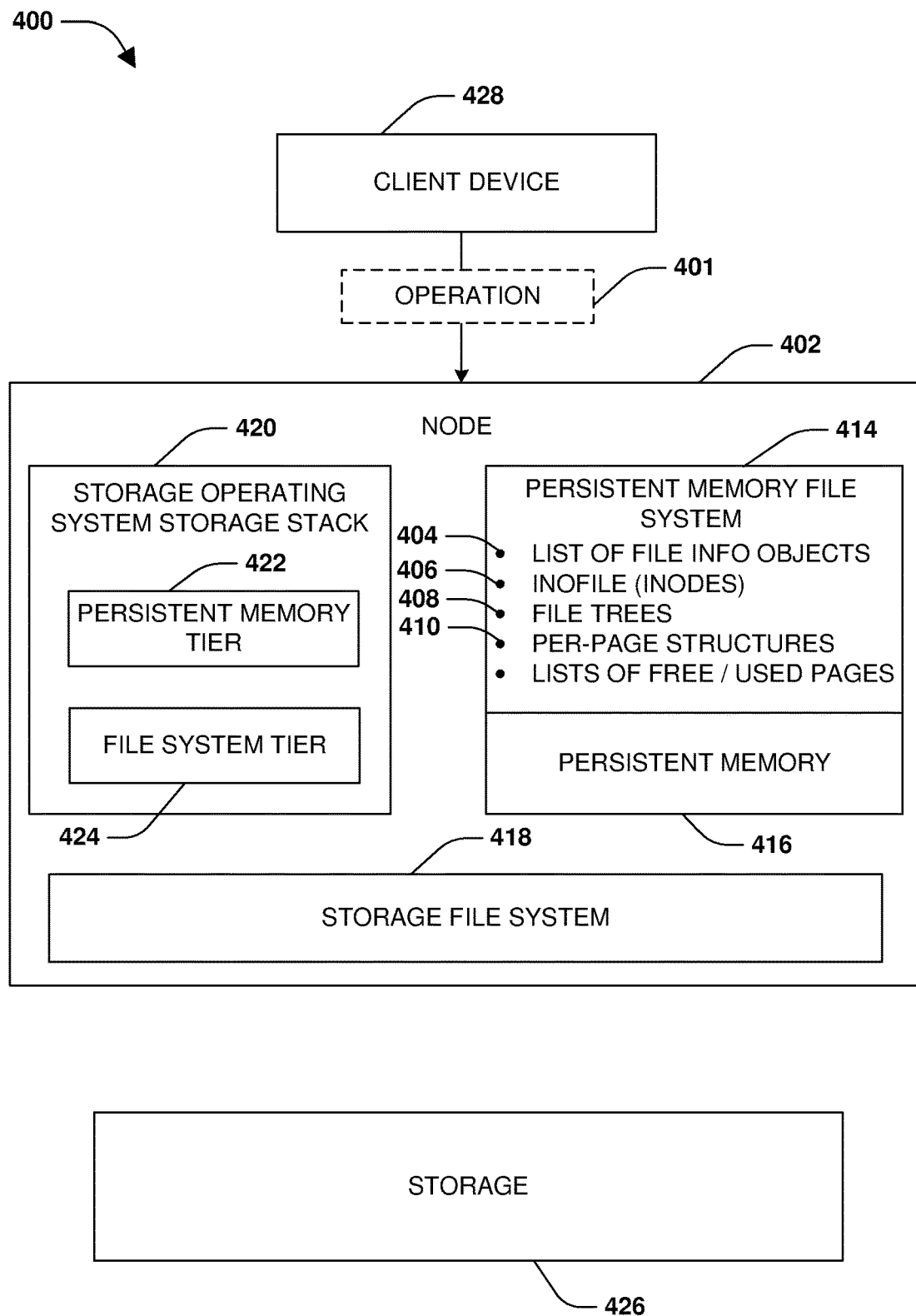
FIG. 4 is a block diagram illustrating an example of various components of system for implementing a persistent memory tier and a file system tier in accordance with an embodiment of the invention.

FIG. 4 illustrates a system 400 comprising node 402 that implements a file system tier 424 to manage storage 426 and a persistent memory tier 422 to manage persistent memory 416 of the node 402. The node 402 may comprise a server, an on-premise device, a virtual machine, computing resources of a cloud computing environment (e.g., a virtual machine hosted within the cloud), a computing device, hardware, software, or combination thereof. The node 402 may be configured to manage the storage and access of data on behalf of clients, such as a client device 428. The node 402 may host a storage operating system configured to store and manage data within and/or across various types of storage devices, such as locally attached storage, cloud storage, disk storage, flash storage, solid state drives, tape, hard disk drives, etc. For example, the storage operating system of the node 402 may store data within storage 426, which may be composed of one or more types of block-addressable storage (e.g., disk drive, a solid state drive, etc.) or other types of storage. The data may be stored within storage objects, such as volumes, containers, logical unit numbers (LUNs), aggregates, cloud storage objects, etc. In an embodiment, an aggregate or other storage object may be comprised of physical storage of a single storage device or storage of multiple storage devices or storage providers.

The storage operating system of the node 402 may implement a storage file system 418 that manages the storage and client access of data within the storage objects stored within the storage 426 associated with the node 402. For example, the client device 428 may utilize the storage file system 418 in order to create, delete, organize, modify, and/or access files within directories of a volume managed by the storage file system 418. The storage operating system may be associated with a storage operating system storage stack 420 that comprises a plurality of levels through which operations, such as read and write operations from client devices, are processed. An operation may first be processed by a highest level tier, and then down through lower level tiers of the storage operating system storage stack 420 until reaching a lowest level tier of the storage operating system storage stack 420. The storage file system 418 may be managed by a file system tier 424 within the storage operating system storage stack 420. When an operation reaches the file system tier 424, the operation may be processed by the storage file system 418 for storage within the storage 426.

The storage file system 418 may be configured with commands, APIs, data structures (e.g., data structures used to identify block address locations of data within the storage 426), and/or other functionality (e.g., functionality to access certain block ranges within the storage 426) that is tailored to the block-addressable storage 426. Because the storage file system 418 is tailored for the block-addressable semantics of the storage 426, the storage file system 418 may be unable to utilize other types of storage that use a different addressing semantics such as persistent memory 416 that is byte-addressable. The persistent memory 416 provides relatively lower latency and faster access speeds than the block-addressable storage 426 that the storage file system 418 is natively tailored to manage. Because the persistent memory 416 is byte-addressable instead of block-addressable, the storage file system 418, data structures of the storage file system 418 used to locate data according to block-addressable semantics of the storage 426, and the commands to store and retrieved data from the block-addressable storage 426 may not be able to be leveraged for the byte-addressable persistent memory 416.

Accordingly, a persistent memory file system 414 and the persistent memory tier 422 for managing the persistent memory file system 414 are implemented for the persistent memory 416 so that the node 402 can use the persistent memory file system 414 to access and manage the persistent memory 416 or other types of byte-addressable storage for storing user data. The persistent memory 416 may comprise memory that is persistent, such that data structures can be stored in a manner where the data structures can continue to be accessed using memory instructions and/or memory APIs even after the end of a process that created or last modified the data structures. The data structures and data will persist even in the event of a power loss, failure and reboot, etc.

The persistent memory 416 is non-volatile memory that has nearly the same speed and latency of DRAM and has the non-volatility of NAND flash. The persistent memory 416 could dramatically increase system performance of the node 402 compared to the higher latency and slower speeds of the block-addressable storage 426 accessible to the node 402 through the storage file system 418 using the file system tier 424 (e.g., hard disk drives, solid state storage, cloud storage, etc.). The persistent memory 416 is byte-addressable, and may be accessed through a memory controller. This provides faster and more fine-grained access to persistent storage within the persistent memory 416 compared to block-based access to the block-addressable storage 426 through the storage file system 418.

The persistent memory file system 414 implemented for the byte-addressable persistent memory 416 is different than the storage file system 418 implemented for the block-addressable storage 426. For example, the persistent memory file system 414 may comprise data structures and/or functionality tailored to byte-addressable semantics of the persistent memory 416 for accessing bytes of storage, which are different than data structures and functionality of the storage file system 418 that are tailored to block-addressable semantics of the storage 426 for accessing blocks of storage. Furthermore, the persistent memory file system 414 is tailored for the relatively faster access speeds and lower latency of the persistent memory 416, which improves the operation of the node 402 by allowing the node 402 to process I/O from client devices much faster using the persistent memory tier 422, the persistent memory file system 414, and the persistent memory 416.

In order to integrate the persistent memory 416 into the node 402 in a manner that allows client data of client devices, such as the client device 428, to be stored into and read from the persistent memory 416, the persistent memory tier 422 is implemented within the storage operating system storage stack 420 for managing the persistent memory 416. The persistent memory tier 422 is maintained at a higher level within the storage operating system storage stack 420 than the file system tier 424 used to manage the storage file system 418. The persistent memory tier 422 is maintained higher in the storage operating system storage stack 420 than the file system tier 424 so that operations received from client devices by the node 402 are processed by the persistent memory tier 422 before the file system tier 424 even though the operations may target the storage file system 418 managed by the file system tier 424. This occurs because higher levels within the storage operation system storage stack 420 process operations before lower levels within the storage operating system storage stack 420.

The persistent memory tier 422 may implement various APIs, functionality, data structures, metadata, and commands for the persistent memory file system 414 to access and/or manage the persistent memory 416. For example, the persistent memory tier 422 may implement APIs to access the persistent memory file system 414 of the persistent memory 416 for storing data into and/or retrieving data from the persistent memory 416 according to byte-addressable semantics of the persistent memory 416. The persistent memory tier 422 may implement functionality to determine when data should be tiered out from the persistent memory 416 to the storage 426 based upon the data becoming infrequently accessed, and thus cold.

The persistent memory file system 414 is configured with data structures and/or metadata for tracking and locating data within the persistent memory 416 according to the byte-addressable semantics. For example, the persistent memory file system 414 indexes the persistent memory 416 of the node 402 as an array of pages (e.g., 4 kb pages) indexed by page block numbers. One of the pages, such as a page (1), comprises a file system superblock that is a root of a file system tree of the persistent memory file system 414. A duplicate copy of the file system superblock may be maintained within another page of the persistent memory 416 (e.g., a last page, a second to last page, a page that is a threshold number of indexed pages away from page (1), etc.). The file system superblock comprises a location of a list of file system info objects 404.

The list of file system info objects 404 comprises a linked list of pages, where each page contains a set of file system info objects. If there are more file system info objects than what can be stored within a page, then additional pages may be used to store the remaining file system info objects and each page will have a location of the next page of file system info objects. In this way, a plurality of file system info objects can be stored within a page of the persistent memory 416. Each file system info object defines a file system instance for a volume and snapshot (e.g., a first file system info object correspond to an active file system of the volume, a second file system info object may correspond to a first snapshot of the volume, a third file system info object may correspond to a second snapshot of the volume, etc.). Each file system info object comprises a location within the persistent memory 416 of an inofile (e.g., a root of a page tree of the inofile) comprising inodes of a file system instance.

An inofile 406 of the file system instance comprises an inode for each file within the file system instance. An inode of a file comprises metadata about the file. Each inode stores a location of a root of a file tree for a given file. In particular, the persistent memory file system 414 maintains file trees 408, where each file is represented by a file tree of indirect pages (intermediate nodes of the file tree) and direct blocks (leaf nodes of the file tree). The direct blocks are located in a bottom level of the file tree, and one or more levels of indirect pages are located above the bottom level of the file tree. The indirect pages of a particular level comprise references to blocks in a next level down within the file tree (e.g., a reference comprising a page block number of a next level down node or a reference comprising a per-page structure ID of a per-page structure having the page block number of the next level down node). Direct blocks are located at a lowest level in the file tree and comprise user data. Thus, a file tree for a file may be traversed by the persistent memory file system 414 using a byte range (e.g., a byte range specified by an I/O operation) mapped to a page index of a page (e.g., a 4 k offset) comprising the data within the file to be accessed.

The persistent memory file system 414 may maintain other data structures and/or metadata used to track and locate data within the persistent memory 416. In an embodiment, the persistent memory file system 414 maintains per-page structures 410. A per-page structure is used to track metadata about each page within the persistent memory 416. Each page will correspond to a single per-page structure that comprises metadata about the page. In an embodiment, the per-page structures are stored in an array within the persistent memory 416. The per-page structures correspond to file system superblock pages, file system info pages, indirect pages of the inofile 406, user data pages within the file trees 408, per-page structure array pages, etc.

In an embodiment of implementing per-page structure to page mappings using a one-to-one mapping, a per-page structure for a page can be fixed at a page block number offset within a per-page structure table. In an embodiment of implementing per-page structure to page mappings using a variable mapping, a per-page structure of a page stores a page block number of the page represented by the per-page structure. With the variable mapping, persistent memory objects (e.g., objects stored within the file system superblock to point to the list of file system info objects; objects within a file system info object to point to the root of the inofile; objects within an inode to point to a root of a file tree of a file; and objects within indirect pages to point to child blocks (child pages)) will store a per-page structure ID of its per-page structure as a location of a child page being pointed to, and will redirect through the per-page structure using the per-page structure ID to identify the physical block number of the child page being pointed to. Thus, an indirect entry of an indirect page will comprise a per-page structure ID that can be used to identify a per-page structure having a physical block number of the page child pointed to by the indirect page.

The persistent memory tier 422 may implement functionality to utilize a policy to determine whether certain operations should be redirected to the persistent memory file system 414 and the persistent memory 416 or to the storage file system 418 and the storage 426 (e.g., if a write operation targets a file that the policy predicts will be accessed again, such as accessed within a threshold timespan or accessed above a certain frequency, then the write operation will be retargeted to the persistent memory 416). For example, the node 402 may receive an operation from the client device 428.

The operation may be processed by the storage operating system using the storage operating system storage stack 420 from a highest level down through lower levels of the storage operating system storage stack 420. Because the persistent memory tier 422 is at a higher level within the storage operating system storage stack 420 than the file system tier 424, the operation is intercepted by the persistent memory tier 422 before reaching the file system tier 424. The operation is intercepted by the persistent memory tier 422 before reaching the file system tier 424 even though the operation may target the storage file system 418 managed by the file system tier 424. This is because the persistent memory tier 422 is higher in the storage operating system storage stack 420 than the file system tier 424, and operations are processed by higher levels before lower levels within the storage operating system storage stack 420.

Accordingly, the operation is intercepted by the persistent memory tier 422 within the storage operating system storage stack 420. The persistent memory tier 422 may determine whether the operation is to be retargeted to the persistent memory file system 414 and the persistent memory 416 or whether the operation is to be transmitted (e.g., released to lower tiers within the storage operating system storage stack 420) by the persistent memory tier 422 to the file system tier 424 for processing by the storage file system 418 utilizing the storage 426. In this way, the tiers within the storage operating system storage stack 420 are used to determine how to route and process operations utilizing the persistent memory 416 and/or the storage 426.

In an embodiment, an operation 401 is received by the node 402. The operation 401 may comprise a file identifier of a file to be accessed. The operation 401 may comprise file system instance information, such as a volume identifier of a volume to be accessed and/or a snapshot identifier of a snapshot of the volume to be accessed. If an active file system of the volume is to be accessed, then the snapshot identifier may be empty, null, missing, comprising a zero value, or otherwise comprising an indicator that no snapshot is to be accessed. The operation 401 may comprise a byte range of the file to be accessed.

The list of file system info objects 404 is evaluated using the file system information to identify a file system info object matching the file system instance information. That is, the file system info object may correspond to an instance of the volume (e.g., the active file system of the volume or a snapshot identified by the snapshot identifier of the volume identified by the volume identifier within the operation 401) being targeted by the operation 401, which is referred to as an instance of a file system or a file system instance. In an embodiment of the list of file system info objects 404, the list of file system info objects 404 is maintained as a linked list of entries. Each entry corresponds to a file system info object, and comprises a volume identifier and a snapshot identifier of the file system info object. In response to the list of file system info objects 404 not comprising any file system info objects that match the file system instance information, the operation 401 is routed to the file system tier 424 for execution by the storage file system 418 upon the block-addressable storage 426 because the file system instance is not tiered into the persistent memory 416. However, if the file system info object matching the file system instance information is found, then the file system info object is evaluated to identify an inofile such as the inofile 406 as comprising inodes representing files of the file system instance targeted by the operation 401.

The inofile 406 is traversed to identify an inode matching the file identifier specified by the operation 401. The inofile 406 may be represented as a page tree having levels of indirect pages (intermediate nodes of the page tree) pointing to blocks within lower levels (e.g., a root points to level 2 indirect pages, the level 2 indirect pages point to level 1 indirect pages, and the level 1 indirect pages point to level 0 direct blocks). The page tree has a bottom level (level 0) of direct blocks (leaf nodes of the page tree) corresponding to the inodes of the file. In this way, the indirect pages within the inofile 406 are traversed down until a direct block corresponding to an inode having the file identifier of the file targeted by the operation 401 is located.

The inode may be utilized by the persistent memory file system 414 to facilitate execution of the operation 401 by the persistent memory tier 422 upon the persistent memory 416 in response to the inode comprising an indicator (e.g., a flag, a bit, etc.) specifying that the file is tiered into the persistent memory 416 of the node 402. If the indicator specifies that the file is not tiered into the persistent memory 416 of the node 402, then the operation 401 is routed to the file system tier 424 for execution by the storage file system 418 upon the block-addressable storage 426.

In an embodiment where the operation 401 is a read operation and the inode comprises an indicator that the file is tiered into the persistent memory 416, the inode is evaluated to identify a pointer to a file tree of the file. The file tree may comprise indirect pages (intermediate nodes of the file tree comprising references to lower nodes within the file tree) and direct blocks (leaf nodes of the file tree comprising user data of the file). The file tree may be traversed down through levels of the indirect pages to a bottom level of direct blocks in order to locate one or more direct blocks corresponding to pages within the persistent memory 416 comprising data to be read by the read operation (e.g., a direct block corresponding to the byte range specified by the operation 401). That is, the file tree may be traversed to identify data within one or more pages of the persistent memory 416 targeted by the read operation. The traversal utilizes the byte range specified by the read operation. The byte range is mapped to a page index of a page (e.g., a 4 kb offset) of the data within the file to be accessed by the read operation. In an embodiment, the file tree is traversed to determine whether the byte range is present within the persistent memory 416. If the byte range is present, then the read operation is executed upon the byte range. If the byte range is not present, then the read operation is routed to the file system tier 424 for execution by the storage file system 418 upon the block-based storage 426 because the byte range to be read is not stored within the persistent memory 416. If a portion of the byte range is present within the persistent memory 416, then the remaining portion of the byte range is retrieved from the storage 426.

In an embodiment where the operation 401 is a write operation, access pattern history of the file (e.g., how frequently and recently the file has been accessed) is evaluated in order to determine whether the execute the write operation upon the persistent memory 416 or to route the write operation to the file system tier 424 for execution by the storage file system 418 upon the block-addressable storage 426. In this way, operations are selectively redirected by the persistent memory tier 422 to the persistent memory file system 414 for execution upon the byte-addressable persistent memory 416 or routed to the file system tier 424 for execution by the storage file system 418 upon the block-addressable storage 426 based upon the access pattern history (e.g., write operations targeting more frequently or recently accessed data/files may be executed against the persistent memory 416).

Primary reference counts, such as a hierarchy of primary reference counts where child pages inherit reference counts of parent pages, may be maintained for pages within the persistent memory file system 414. A primary reference count of a page within the persistent memory file system 414 indicates how many times data within the page is referenced by an active file system and/or one or more snapshots and/or one or more file clones.

In the event the persistent memory file system 414 crashes such as where the node 402 experiences a failure, various data and/or metadata stored within the persistent memory 416 can become inconsistent, causing data corruption, memory leaks, and/or other problems. For example, if a reference count becomes incorrect due to a failure occurring while the reference count is being updated, then the reference count may be too large or too small (a value different than a correct reference count value). If the reference count is too large (a value that is higher than a correct reference count value), then memory leaks can occur where the page is retained within persistent memory even though nothing is using/referencing the data within the page. If the reference count is too small (a value that is lower than a correct reference count value), then data corruption can occur where the page is freed and reused to store different data even though the data that was freed is still being used/referenced. In another example of an inconsistency, the node 402 may submit a set of actions to the persistent memory 416 for persisting data into pages of the persistent memory 416. The set of actions may comprise a first write action to write data to a page and a second write action to update a checksum for the page based upon the data written to the page. If the node 402 fails before the persistent memory 416 has successful completed the set of actions, then an inconsistent state can occur where only one of the write actions successfully completed, such as where the data was written to the page but the checksum was not updated with the correct value or the checksum was updated but the data was never written to the page.

In another example of an inconsistency, a file system superblock checksum mismatch can occur if the persistent memory file system 414 crashes during an update to the file system superblock. Checksum mismatches can also occur with user files, such as indirect pages and/or data pages. In another example of an inconsistency, a L1 page within a file tree may have a child L0 page. However, the child L0 page may have a page state different than being a child L0 page (e.g., a metadata indirect L2 page state) even though it should be a child L0 page because it is the child of the L1 page, but the persistent memory file system 414 may have crashed during and before completing an update to the page state of the child L0 page (e.g., to change the page state from the metadata indirect L2 page state to a child L0 page state). Accordingly, as provided herein, inconsistencies within the persistent memory 416 are reconciled in order to place the persistent memory 416 and persistent memory file system 414 into a consistent state in a manner that is non-disruptive to client devices such as the client device 428 accessing data stored within the pages of the persistent memory 416, which is further described in relation to the exemplary method 500 of FIG. 5, the system 600 of FIGS. 6A-6D, and the system 700 of FIGS. 7A-7C.

Figure 5:
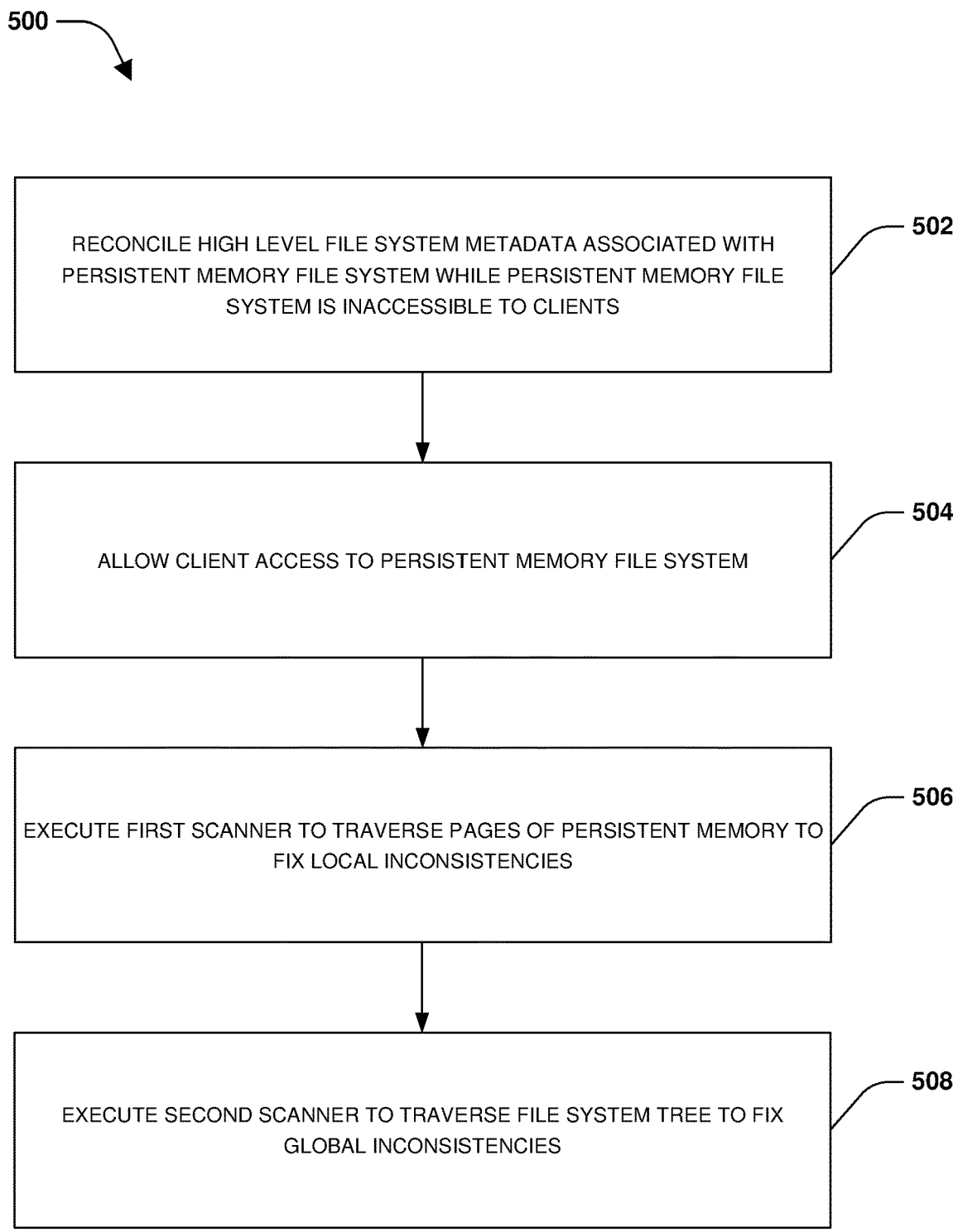
FIG. 5 is a flow chart illustrating an example of a set of operations for persistent memory file system reconciliation in accordance with an embodiment of the invention.

One embodiment of persistent memory file system reconciliation for a persistent memory file system 606 is illustrated by an exemplary method 500 of FIG. 5 and further described in conjunction with system 600 of FIGS. 6A-6D. In an embodiment, a node 602 may correspond to the node 402 of FIG. 4, such as where the node 602 comprises the storage operating system storage stack 420 within which the persistent memory tier 422 is implemented, the persistent memory file system 414 (persistent memory file system 606) used to store and access data within the persistent memory 416 (persistent memory 604), etc.

Figure 6A:
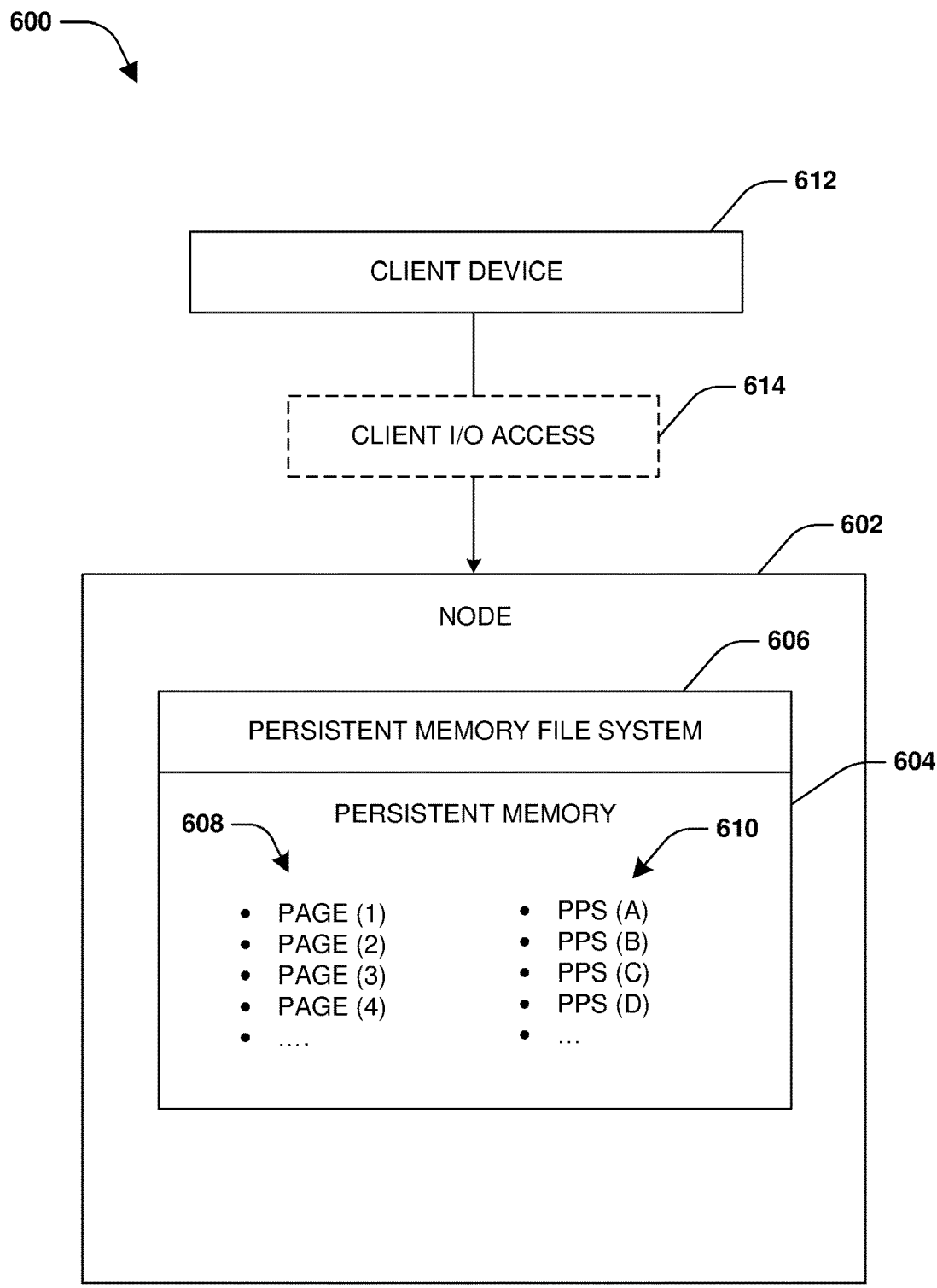
FIG. 6A is a block diagram illustrating an example of persistent memory file system reconciliation, where a node is operational and serving client I/O, in accordance with an embodiment of the invention.

The persistent memory file system 606 may be used to store and organize files, directories, and/or other data within pages 608 of the persistent memory 604 of the node 602, as illustrated by FIG. 6A. For example, data and/or metadata may be stored within a first page, a second page, a third page, a fourth page, and/or other pages of the persistent memory 604. The metadata may comprise information stored within per-page structures 610. A per-page structure is used to track metadata about each page 608 within the persistent memory 604. Each page will correspond to a single per-page structure that tracks/stores metadata about the page. In an embodiment, the per-page structures 610 are stored in an array within the persistent memory 604, sized one entry within the array per page. The per-page structures 610 correspond to file system superblock pages, file system info pages (fsinfo pages), indirect pages of an inofile, user data pages, per-page structure array pages, etc. The persistent memory 604 can be viewed as an array of pages (e.g., 4 kb pages or any other size of pages) indexed by page block numbers, which may be tracked by the per-page structures 610.

In an embodiment of implementing per-page structure to page mappings (e.g., mappings of a per-page structure to a physical page within the persistent memory 604) using a one-to-one mapping, a per-page structure for a page can be fixed at a page block number offset within a per-page structure table. In an embodiment of implementing per-page structure to page mappings using a variable mapping, a per-page structure of a page stores the page block number of the page represented by the per-page structure. With the variable mapping, persistent memory objects (e.g., objects stored within the file system superblock to point to the list of file system info objects, stored within a file system info object to point to the root of the inofile, stored within an inode to point to a root of a file tree of a file, and/or stored within indirect pages to point to child blocks (child pages)) will store a per-page structure ID of its per-page structure as a location of the page being pointed to, and will redirect through the per-page structure using the per-page structure ID to identify the physical block number of the page being pointed to. Thus, an indirect entry of an indirect page will comprise a per-page structure ID that can be used to identify a per-page structure having a physical block number of the page pointed to by the indirect page.

An indirect entry will comprise a generation count of a page being pointed to by the indirect entry. Each per-page structure will also store a generation count, which is incremented each time a corresponding page is scavenged where the page is evicted from the persistent memory 604. When a page is linked into a parent indirect page (an indirect entry), the per-page structure ID is set and a current generation count is set. As the persistent memory 604 becomes full, pages must be scavenged (evicted) for reuse as other data and/or metadata. Instead of a scavenging process having to locate a page's parent linking to the page, zeroing out the per-page structure ID, and updating a checksum, the generation count within the per-page structure is simply increased.

Any code and commands that walk the file system tree will first check for generation count mismatch between a generation count within an indirect entry and a generation count within the per-page structure. If there is a mismatch, then the code and commands will know that the page being pointed to has been scavenged and evicted from the persistent memory. Thus, in a single step, all references to the scavenged page will be invalidated because the generation count in all of the indirect pages referencing the scavenged page will not match the increased generation count within the per-page structure.

In an embodiment, a generation count of a child page pointed to by an indirect entry of an indirect page is stored within a generation count field within the indirect entry. A per-page structure ID of a per-page structure for the child page pointed to by the indirect entry of the indirect page is stored within a per-page structure field within the indirect entry. The generation count field and the per-page structure field may be stored within 8 bytes of the indirect entry so that the generation count field and the per-page structure field are 8 byte aligned. This allows the generation count field and the per-page structure field to be atomically set together, such that either both fields will successfully be set or both fields will fail to be set such as in the event of a crash or failure so that there is no partial modification of either field (e.g., both fields can be set by a single operation to the persistent memory). This prevents data loss that would otherwise occur if only one or the other or portions thereof of the generation count field and/or the per-page structure field are updated before the crash or failure. In an example of updating the fields (metadata) based upon a copy-on-write operation of a page, a parent indirect entry of the page is updated to reflect a new per-page structure ID and generation count of the page targeted by the copy-on-write operation.

A per-page structure of a page may comprise additional metadata information. In an embodiment, the per-page structure comprises a checksum of content in the page. When the page is updated in place by a first transaction (a first action), the checksum may be updated by a second transaction (a second action). If the second transaction does not complete due to a crash, then the existing checksum may not match the data. However, this does not necessarily imply a corruption since that data was updated by the first transaction. Thus, the second transaction can be tried again after recovery from the crash. In an embodiment, the per-page structure comprises a reference count to the page. The reference count may correspond to how many references to the page there are by an active file system of a volume, volume snapshots of the volume, and file clones of a file whose data is stored within the page. In an example, the persistent memory file system 606 for the persistent memory 604 may utilize hierarchical reference counting to support volume snapshots and file clones. Thus, a hierarchical reference on the page may be stored within the per-page structure.

In an embodiment, the per-page structure comprises a page state of the page. The page state may be a free state indicating that the page is not in use (e.g., no data is stored within the page). The page state may be a read cached state indicating that content of the page stored within the persistent memory 604 by the persistent memory file system 606 matches corresponding content maintained by the storage file system within storage of the node 602. In this way, the read cached state may be an indication that a copy of the corresponding content has been cached within the page of the persistent memory 604. The page state may be a dirty state indicating that the content of the page stored within the persistent memory 604 by the persistent memory file system 606 does not match corresponding content maintained by the storage file system within storage of the node. Thus, if the page is scavenged while having the dirty state, the content of the page is flushed from the persistent memory 604 and is tiered out through a storage file system for storage within the storage managed by a storage file system.

When actions are executed upon the persistent memory 604, such as to write to a page, update a reference count of a page, modify metadata within a per-page structure (e.g., a checksum, a page state, etc.), etc., the order that the persistent memory 604 persists the actions is not guaranteed or controllable. For example, if a set of actions to add a page into the persistent memory 604 (e.g., link the page into the persistent memory file system 606) and to increment a reference count for the page is transmitted to the persistent memory 604, then there is no guarantee of the order with which the architecture of the persistent memory 604 will persist/execute the actions. This can cause issues when the node 602 experiences a failure and/or the persistent memory file system 606 crashes while the set of actions are pending with the persistent memory 604 because there is no way to tell which actions successfully persisted and which actions did not successfully persist. For example, without knowing whether the reference count for the page was updated or not, a current value of the reference count after the node 602 recovers from the failure could be incorrect such as where only the page was added to the persistent memory 604 and the reference count was never updated. Incorrect reference counts can cause memory leaks due to reference counts being higher than the correct value and/or data corruption due to reference counts being lower than the correct value. A wide variety of other types of inconsistencies can occur, such as checksum mismatches, pages having incorrect page states (e.g., an L0 data page may have an indirect L2 page state instead of a child L0 page state), incorrect information within metadata of per-page structures, etc.

Accordingly, as provided herein, inconsistencies within the persistent memory 604 and persistent memory file system 606 are reconciled in a manner that is non-disruptive to client access. During normal operation, the node 602 may provide client devices with read and write access to data stored within pages of the persistent memory 604, which may be organized and managed by the persistent memory file system 606. For example, the node 602 may provide a client device 612 with client I/O access 614 to the persistent memory 604 through the persistent memory file system 606 during normal operation, as illustrated by FIG. 6A.

In an embodiment of processing operations from the client device 612, the node 602 may create one or more episodes that are separately committed one at a time to the persistent memory 604. Actions of an operation (e.g., a write action to write data to a page, a write action to update a checksum of the page, a write action to modify metadata within a per-page structure) that can be committed in any order are grouped into an episode. Actions can be committed in any order if a consistent state of the persistent memory 604 can be reconciled regardless of which actions were successfully performed and which actions were not successfully performed in the event the persistent memory file system 606 crashes while the episode is pending.

If two actions cannot be committed in any order with respect to one another, then those actions are grouped into separate episodes from one another. Episodes are used to group certain actions in a manner that ensures that content of the persistent memory 604 can be reconstructed into a consistent state in the event a crash or other failure occurs during the processing of any episode. In this way, an episode may be created to comprise a set of actions that can be persisted in any order by the persistent memory 604 that allows for a consistent state of the persistent memory 604 to be recovered during a reboot sequence and/or a takeover sequence regardless of the order with which the set of actions are persisted.

Figure 6B:
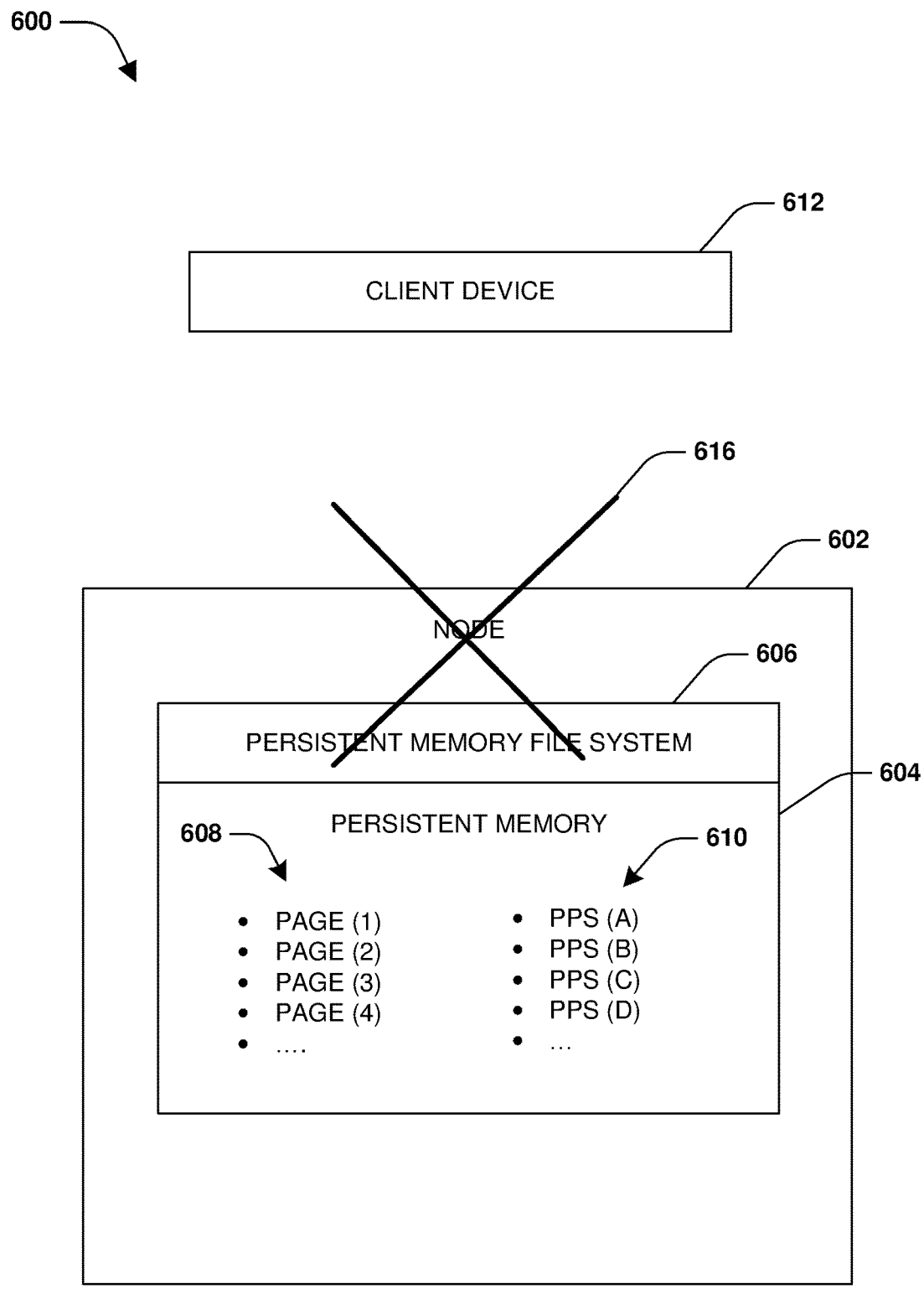
FIG. 6B is a block diagram illustrating an example of persistent memory file system reconciliation, where a node fails, in accordance with an embodiment of the invention.

The persistent memory file system 606 may crash at some point in time, such as where the node 602 experiences a failure 616, as illustrated by FIG. 6B. When the persistent memory file system 606 crashes, an episode may be pending at the persistent memory 604. Because the persistent memory 604 may persistent the actions of the episode in any order, the actions of the episode may have been selectively included within the episode such that if the failure 616 occurs while the episode is pending at the persistent memory 604, then a consistent state of the persistent memory 604 can still be determined. One or more fixable inconsistencies can arise because the persistent memory 604 may persist operations/actions in a non-guaranteed order. Accordingly, a reboot sequence is performed in order to identify and fix any inconsistencies with the persistent memory 604 and persistent memory file system 606 in order to place the persistent memory 604 and persistent memory file system 606 into a consistent state.

Figure 6C:
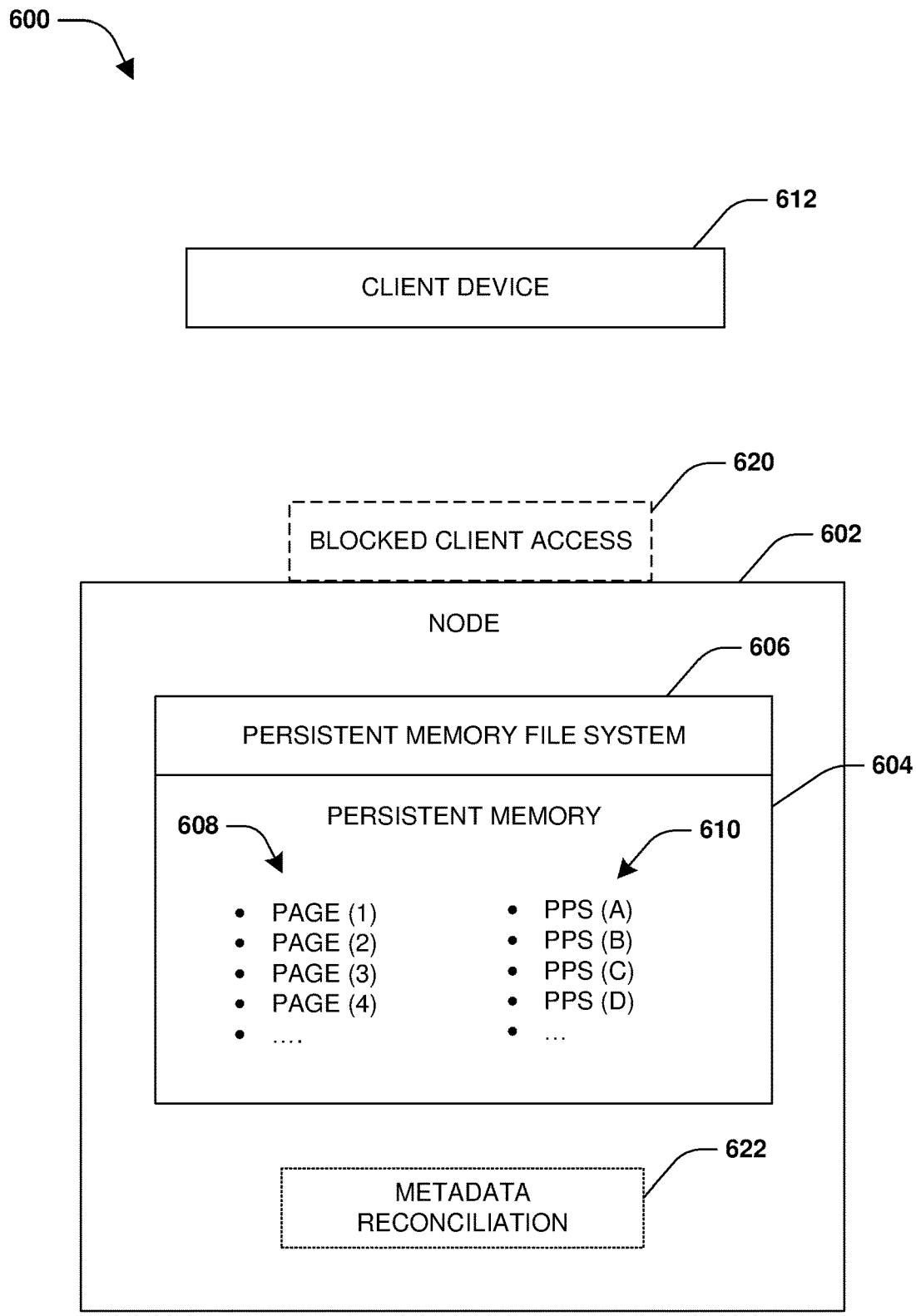
FIG. 6C is a block diagram illustrating an example of persistent memory file system reconciliation, where high level file system metadata is reconciled while client access is blocked, in accordance with an embodiment of the invention.

During operation 502 of method 500 of FIG. 5, as part of the reboot sequence, high level file system metadata associated with the persistent memory file system 606 is reconciled by a metadata reconciliation process 622, as illustrated by FIG. 6C. The high level file system metadata may be reconciled by the metadata reconciliation process 622 during the reboot sequence while the persistent memory 604 and the persistent memory file system 606 is unavailable 620 for client access. For example, the node 602 may block incoming client I/O operations, queue incoming client I/O operations, or delay the mounting of the persistent memory file system 606 for client access as part of the reboot sequence. The metadata reconciliation process 622 may identify inconsistencies associated with file system objects within the persistent memory 604, such as per volume state information, per system state information, etc. For example, the persistent memory 604 may comprise a page that stores information about one or more volumes. This page has a per-page structure for storing metadata about the page. The page itself comprises metadata about the volume, such as a state of the volume, a location of snapshots of the volume, a size of the volume, etc.

The metadata reconciliation process 622 identifies and fixes inconsistencies associated with metadata within the page about the volume and the metadata within the per-page structure about the page. Other higher level file system metadata may include the file system superblock that comprises metadata about the persistent memory file system 606 and has its own per-page structure comprising metadata about a page comprising the file system superblock, which may also be processed by the metadata reconciliation process 622. The metadata reconciliation process 622 may be performed very quickly (e.g., within a few seconds or less), and thus the persistent memory 604 and the persistent memory file system 606 is unavailable 620 for client access for a very short period of time, thus minimizing any client disruption.

Figure 6D:
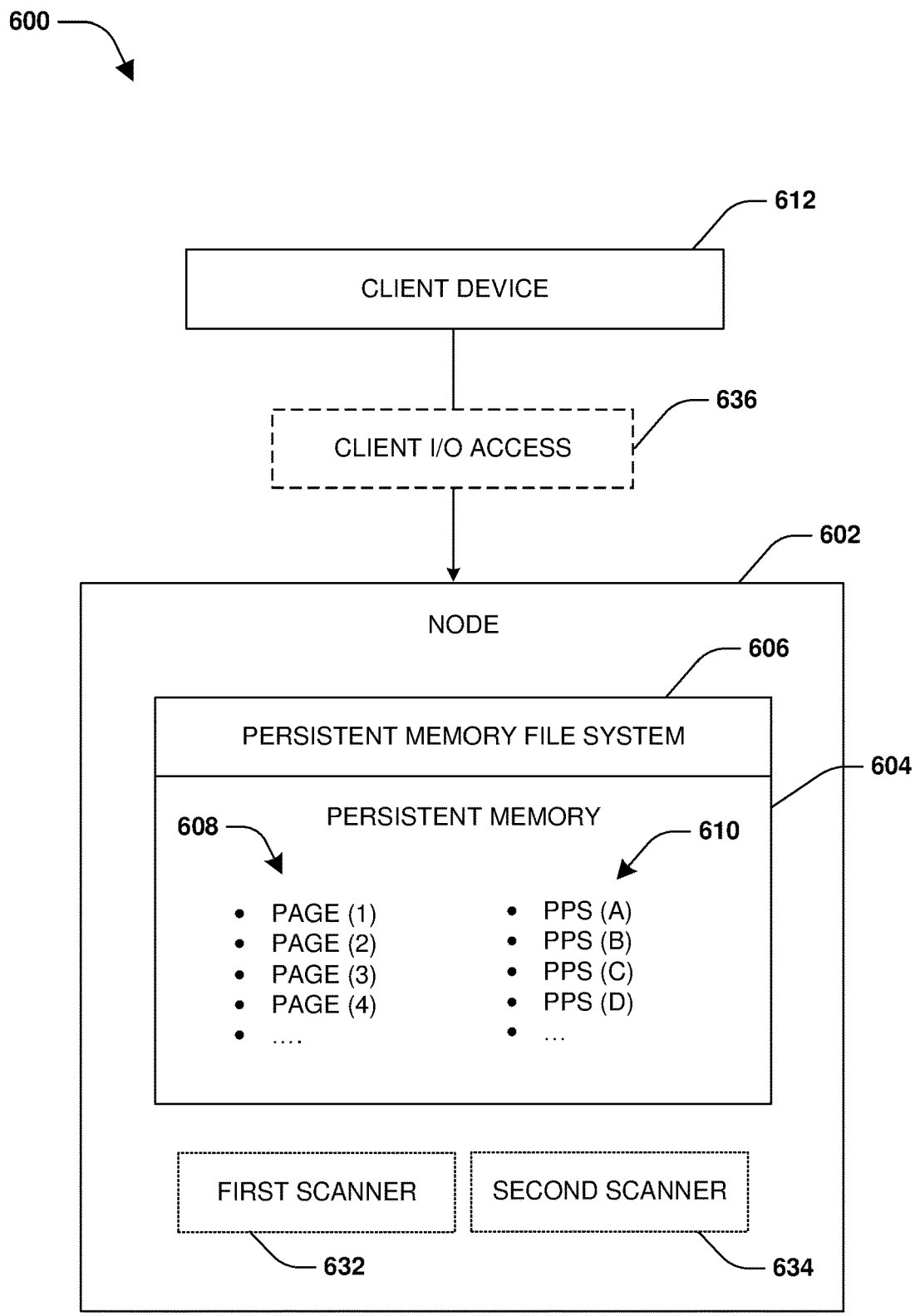
FIG. 6D is a block diagram illustrating an example of persistent memory file system reconciliation, where a first scanner and a second scanner are executed to fix local and global inconsistencies, in accordance with an embodiment of the invention.

During operation 504 of method 500 of FIG. 5, the node 602 provides client I/O access 636 to the persistent memory file system 606 and persistent memory 604, such as to the client device 612, as illustrated by FIG. 6D. The client I/O access 636 may be provided in response to the metadata reconciliation process 622 successfully completing. Even though the entire persistent memory file system 606 and persistent memory 604 have not yet been scanned to detect and fix inconsistencies, the client I/O access 636 is provided in a manner that will not expose clients to such inconsistencies. As will be further discussed, if an I/O operation targets a page that has yet to be scanned, the page will be scanned for inconsistencies and any identified inconsistencies will be fixed as part of executing the I/O operation.

During operation 506 of method 500 of FIG. 5, a first scanner 632 is executed to traverse the pages 608 of the persistent memory 604 to fix local inconsistencies associated with the pages 608. A local inconsistency is an inconsistency associated with a first set of metadata (e.g., metadata within a per-page structure of a page) or data of the page that can be fixed using a second set of metadata (e.g., other metadata within the per-page structure of the page) or other data of the page. That is, a local inconsistency can exist within data of a page or metadata of the page (e.g., metadata within a per-page structure), which can be fixed using other data and/or metadata of the page without having to access data or metadata of other pages.

In an embodiment, the first scanner 632 is executed while the node 602 is providing client I/O access 636 to the persistent memory file system 606 and persistent memory 604, which allows for local inconsistencies to be fixed without impacting client access to data stored within the persistent memory 604. For example, the first scanner 632 is asynchronously executed (e.g., executed in parallel with the processing of client I/O operations) based upon a determination that the first scanner 632 cannot complete within a time window, such as due to there being a threshold number of pages 608 within the persistent memory 604 to scan and/or the persistent memory file system 606 being larger than a threshold size (e.g., the work to be performed by the first scanner 632 is not small enough for the first scanner 632 to finish before allowing the client I/O access 636 without unduly affecting client I/O latency and performance). Otherwise, if the first scanner 632 can be executed within the time window (e.g., within a time frame that is not too disruptive to clients), then the first scanner 632 may be executed synchronously (e.g., executed while the client I/O access is unavailable 620, such as when the metadata reconciliation process 622 is being performed).

Executing the first scanner 632 synchronously simplifies the process of fixing the local inconsistencies, but can impact performance such as by increasing client I/O latency because the client I/O access is unavailable 620 until the first scanner 632 completes. Each per-page structure 610 for the pages 608 within the persistent memory 604 may comprise a state that is set to indicate whether the first scanner 632 as processed a page or has yet to process the page for fixing any local inconsistencies.

During operation 508 of method 500 of FIG. 5, a second scanner 634 is executed to traverse a file system tree of the persistent memory 604 to fix global inconsistencies. In an embodiment, the second scanner 634 starts the traversal at a file system superblock of the file system tree. A global inconsistency may correspond to an inconsistency with data of a first page or metadata of the first page (e.g., metadata within a per-page structure for the first page). The global inconsistency is identified and fixed using data and/or metadata (e.g., metadata within other per-page structures) associated with one or more other pages and/or file system objects (e.g., inodes, volumes, etc.) within the persistent memory 604. That is, a global inconsistency of data or metadata associated with a page may be fixed using information from file system objects (e.g., properties of an inode such as a file ID, a state, etc.) and/or data or metadata of other pages. Fixing a global inconsistency of a page my change either metadata within a per-page structure of the page or page contents for pages containing file system metadata (e.g., the file system superblock, volume information, inodes, etc.) through file system superblocks and volumes.

In an embodiment, the second scanner 634 is executed while the node 602 is providing client I/O access 636 to the persistent memory file system 606 and persistent memory 604, which allows for global inconsistencies to be fixed without impacting client access to data stored within the persistent memory 604. For example, the second scanner 634 is asynchronously executed (e.g., executed in parallel with the processing of client I/O operations) based upon a determination that the second scanner 634 cannot complete within a time window, such as due to there being a threshold number of pages 608 within the persistent memory 604 to scan and/or the persistent memory file system 606 being larger than a threshold size (e.g., the work to be performed by the second scanner 634 is not small enough for the second scanner 634 to finish before allowing the client I/O access 636 without unduly affecting client I/O latency and performance). Otherwise, if the second scanner 634 can be executed within the time window (e.g., within a time frame that is not too disruptive to clients), then the second scanner 634 may be executed synchronously (e.g., executed while the client I/O access is unavailable 620, such as when the metadata reconciliation process 622 is being performed). Executing the second scanner 634 synchronously simplifies the process of fixing the local inconsistencies, but can impact performance such as by increasing client I/O latency because the client I/O access is unavailable 620 until the second scanner 634 completes. Each per-page structure 610 for the pages 608 within the persistent memory 604 may comprise a state that is set to indicate whether the second scanner 634 as processed a page or has yet to process the page for fixing any global inconsistencies.

Client I/O operations can be processed without exposing clients to inconsistencies while the first scanner 632 and/or the second scanner 634 are executing. In particular, a client I/O operation, such as a read or write operation, directed to a page within the persistent memory 604 may be received from the client device 612 by the node 602. If state information within a per-page structure for the page indicates that both the first scanner 632 has processed the page for fixing any local inconsistencies and the second scanner 634 has processed the page for fixing any global inconsistencies, then the client I/O operation is executed as normal.

However, if the state information indicates that the first scanner 632 has not yet processed the page for fixing any local inconsistencies and/or the second scanner 634 has not yet processed the page for fixing any global inconsistencies, then the first scanner 632 (e.g., if the first scanner 632 has not yet processed the page) and/or the second scanner 634 (e.g., if the second scanner 634 has not yet processed the page) are executed on-demand (e.g., executed upon the page, the per-page structure, the file system tree in relation to the page, etc.) in-line with executing the client I/O operation. That is, as part of executing the client I/O operation, whatever scanners have not yet processed the page are executed in relation to the page, and once the scanner(s) are done, then the client I/O operation is executed. In this way, client I/O operations can be processed without exposing clients to inconsistencies.

Figure 7A:
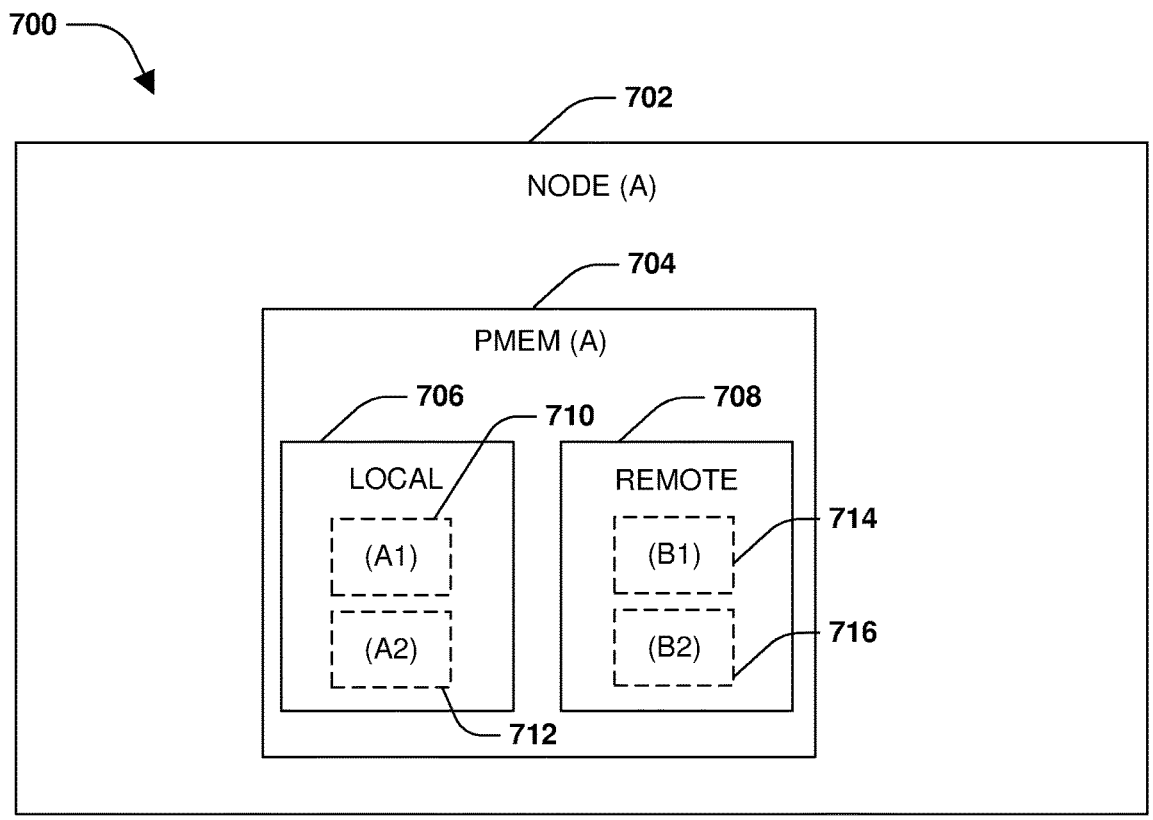
FIG. 7A is a block diagram illustrating an example of persistent memory file system reconciliation, where a node (A) and a node (B) are configured as partner nodes, in accordance with an embodiment of the invention.
Figure 7A:
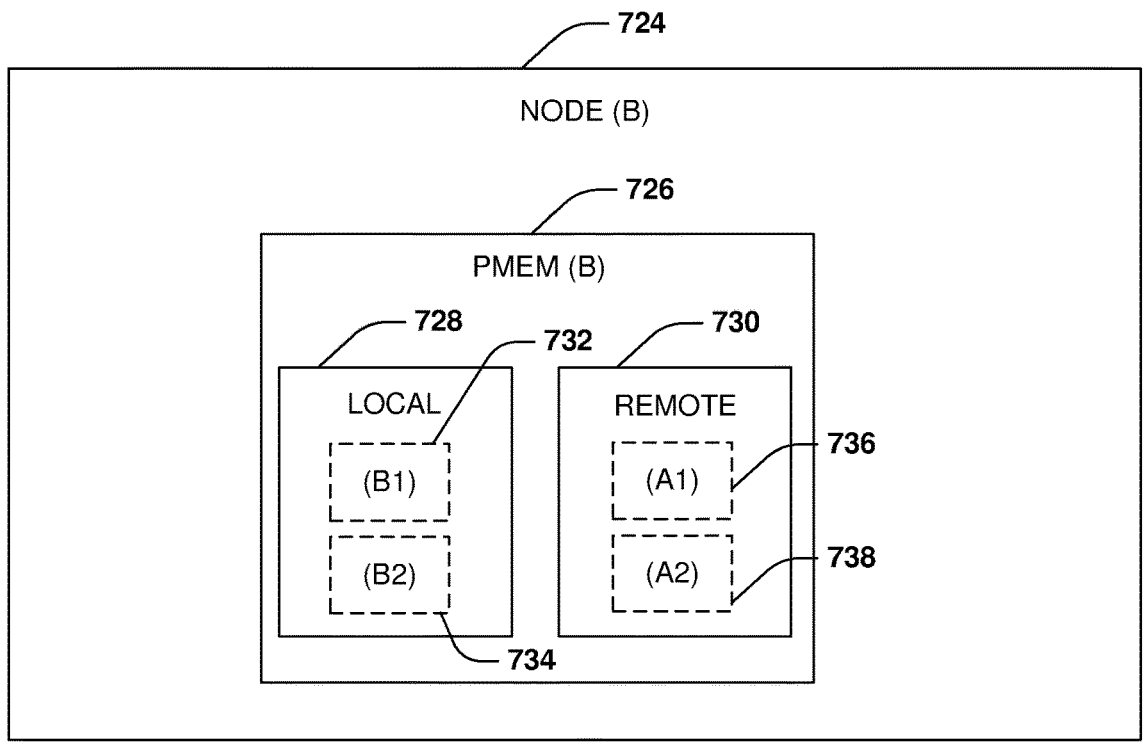
Figure 7B:
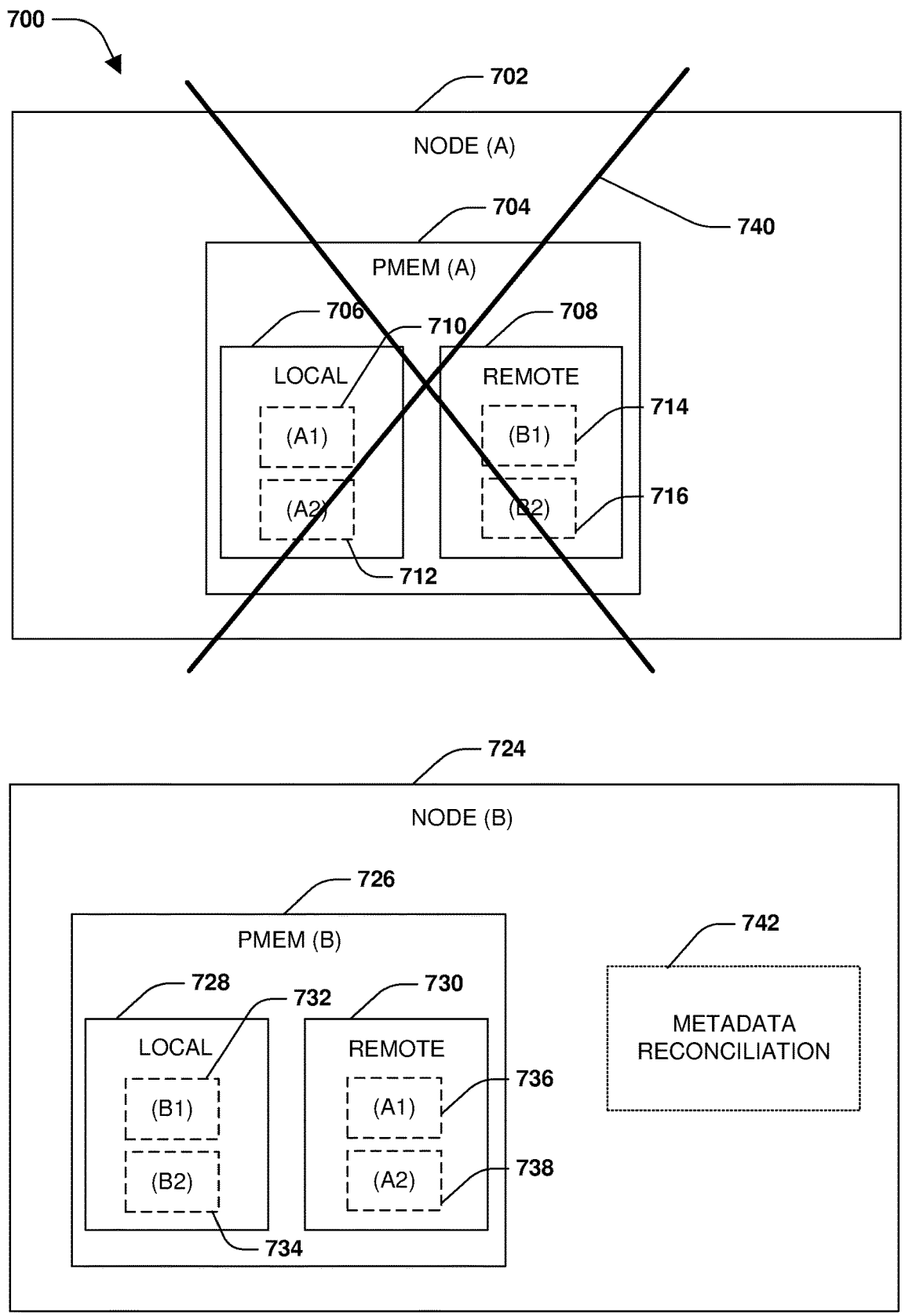
FIG. 7B is a block diagram illustrating an example of persistent memory file system reconciliation, where a node (B) takes over for a node (A) that has failed, and the node (B) reconciles high level file system metadata while client access is blocked, in accordance with an embodiment of the invention.
Figure 7C:
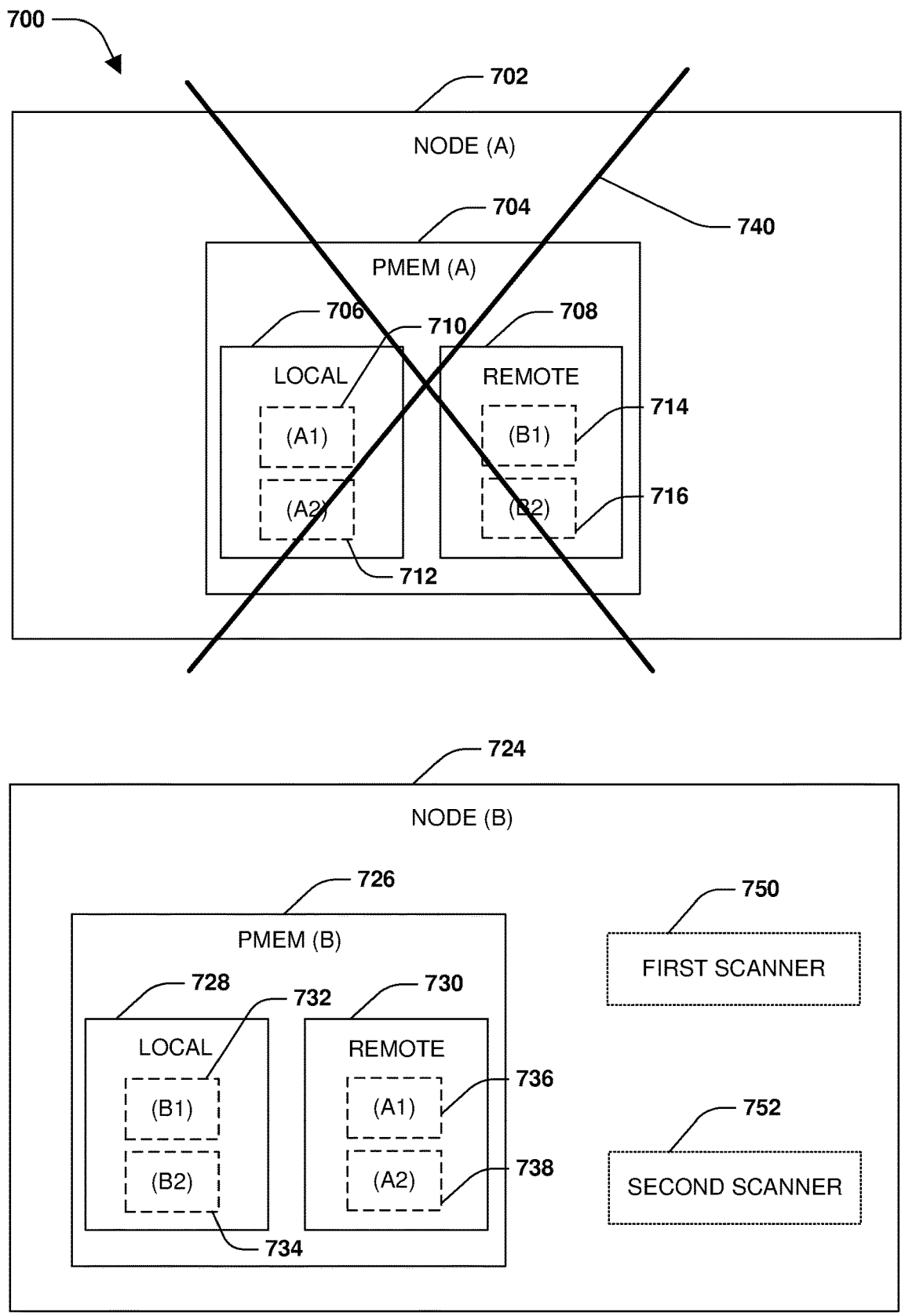
FIG. 7C is a block diagram illustrating an example of persistent memory file system reconciliation, where a node (B) has taken over for a node (A) that has failed, and the node (B) executes a first scanner and a second scanner to fix local and global inconsistencies, in accordance with an embodiment of the invention.

FIGS. 7A-7C illustrate a system 700 for persistent memory file system reconciliation. A node (A) 702 may comprise a persistent memory (A) 704. The persistent memory (A) 704 may be partitioned into a local partition 706 into which the node (A) 702 locally stores data, such as data (A1) 710 and data (A1) 712, associated with clients accessing the node (A) 702. The persistent memory (A) 704 may be partitioned into a remote partition 708 into which mirrored data, such as mirrored data (B1) 714 and mirrored data (B2) 716, from a node (B) 724 is mirrored (e.g., a mirror of data (B1) 732 and a mirror of data (B2) 734 within a local partition 728 of a persistent memory (B) 726 of the node (B) 724). The node (B) 724 may comprise the persistent memory (B) 726. The persistent memory (B) 726 may be partitioned into the local partition 728 into which the node (B) 724 locally stores data, such as the data (B1) 732 and the data (B2) 734, associated with clients access the node (B) 724.

The persistent memory (B) 726 may be partitioned into a remote partition 730 into which mirrored data, such as mirrored data (A1) 736 and mirrored data (A2) 738, from a node (A) 702 is mirrored (e.g., a mirror of the data (A1) 710 and a mirror of the data (A2) 712). In this way, the node (A) 702 locally stores data within the local partition 706 of the persistent memory (A) 704, which is mirrored into the remote partition 730 of the persistent memory (B) 726 of the node (B) 724, and the node (B) 724 locally stores data within the local partition 728 of the persistent memory (B) 726, which is mirrored into the remote partition 708 of the persistent memory (A) 704 of the node (A) 702.

In response to the node (B) 724 determining that the node (A) 702 has experienced a failure 740, the node (B) 724 may perform a takeover sequence in order to take over the processing of client I/O operations that would have been directed to the node (A) 702 and executed upon the local partition 706 of the persistent memory (A) 704 by the node (A) 702, as illustrated by FIG. 7B. As part of the takeover sequence, the node (B) 724 will process the client I/O operations using the remote partition 730 of the persistent memory (B) 726 (e.g., use the data mirrored into the remote partition 730). However, inconsistencies with the remote partition 730 of the persistent memory (B) 726 may arise due to the failure 740. Accordingly, a metadata reconciliation process 742 is performed upon the remote partition 730 of the persistent memory (B) 726 in order to reconcile high level file system metadata within a persistent memory file system of the remote partition 730. In an embodiment, the metadata reconciliation process 742 is performed while client I/O access to the persistent memory (B) 726 in inaccessible. A first scanner 750 is executed to fix local inconsistencies within the persistent memory file system of the remote partition 730 and a second scanner 752 is executed to fix global inconsistencies within the persistent memory file system of the remote partition 730, as illustrated by FIG. 7C. In an embodiment, the first scanner 750 and/or the second scanner 752 may be executed in parallel with the node (B) 724 processing client I/O operations using the remote partition 730.

Figure 8:
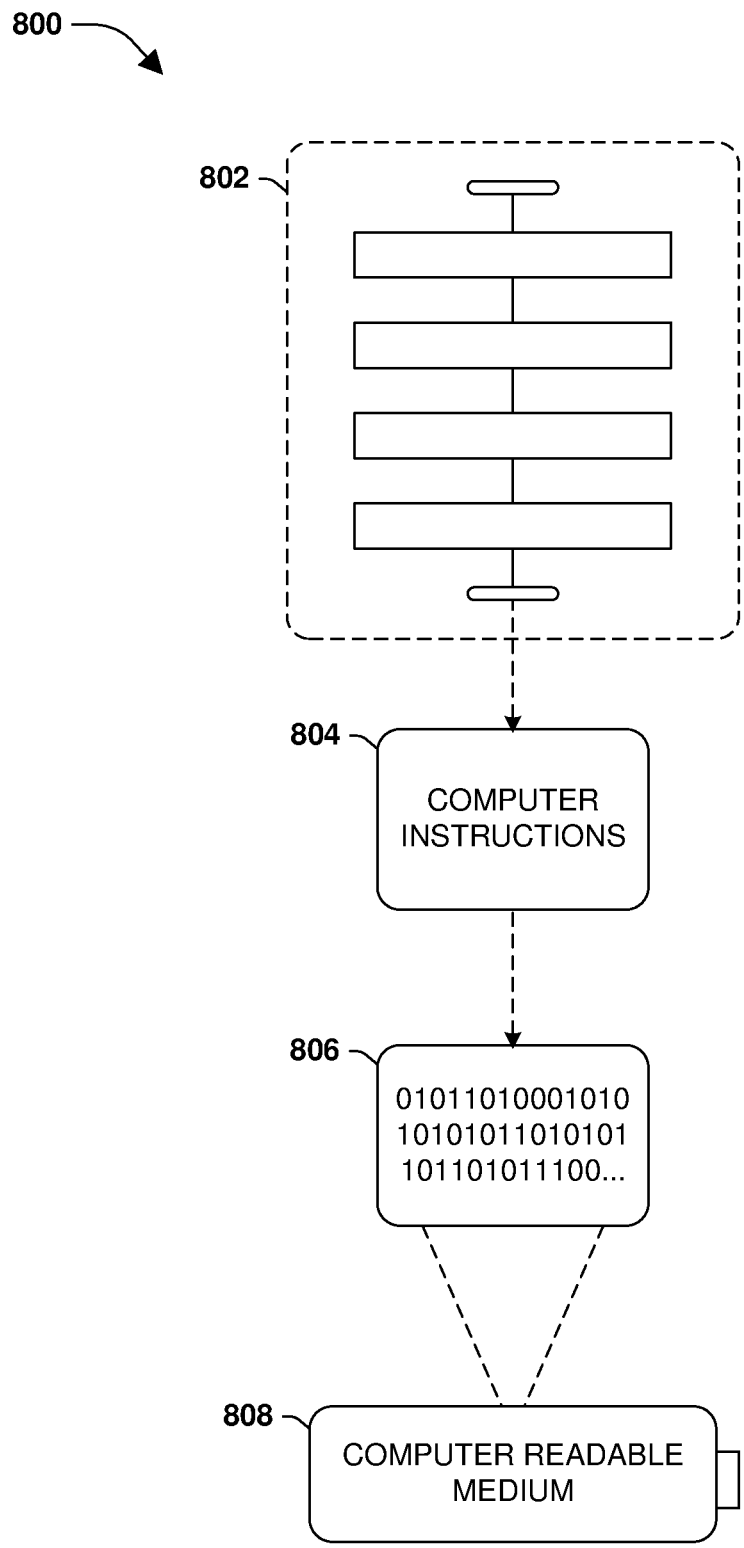
FIG. 8 is an example of a computer readable medium in which an embodiment of the invention may be implemented.

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 802, such as at least some of the exemplary method 500 of FIG. 5, for example. In some embodiments, the processor-executable computer instructions 804 are configured to implement a system, such as at least some of the exemplary system 400 of FIG. 4, at least some of the exemplary system 600 of FIGS. 6A-6D and/or at least some of the exemplary system 700 of FIGS. 7A-7C, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   mirroring data between a first persistent memory of a first node and a second persistent memory of a second node, wherein data within a local partition of the first persistent memory is mirrored to a remote partition of the second persistent memory;
   performing a takeover sequence by the first node to take over processing of client I/O in place of the second node in response to the second node failing;
   executing a scanner to traverse a file system tree of the remote partition to fix global inconsistencies; and
   in response to receiving a client I/O operation directed to a page within the persistent memory, executing the scanner on-demand upon the file system tree in relation to the page and in-line with executing the client I/O operation based upon a determination that the scanner has not yet traversed the page.

2. The method of claim 1, wherein the scanner is a first scanner, and wherein the takeover sequence comprises:
   reconciling high level file system metadata within a persistent memory file system of the remote partition while client access to the persistent memory file system is inaccessible until reconciliation of the high level file system metadata has completed.

3. The method of claim 2, wherein the takeover sequence comprises:
   executing a first scanner to traverse pages of the remote partition to fix local inconsistencies associated with the pages.

4. The method of claim 3, wherein the first scanner is executed asynchronously with respect to processing the client I/O directed to the persistent memory file system of the remote partition.

5. The method of claim 3, wherein the takeover sequence comprises:
   processing the client I/O operation based upon a determination that the scanner and the first scanner have traversed the page.

6. The method of claim 1, wherein the scanner is executed asynchronously in parallel with processing the client I/O directed to the persistent memory file system of the remote partition.

7. The method of claim 3, comprising:
in response to receiving a first client I/O operation directed to the page within the persistent memory, processing the first client I/O operation based upon a determination that the first scanner has traversed the page.

8. The method of claim 3, comprising:
in response to receiving a first client I/O operation directed to the page within the persistent memory, executing the first scanner on-demand upon the page and in-line with executing the client I/O operation based upon a determination that the first scanner has not yet traversed the page.

9. The method of claim 3, comprising:
in response to receiving a first client I/O operation directed to the page within the persistent memory, processing the client I/O operation based upon a determination that the first scanner and the scanner have traversed the page.

10. The method of claim 1, comprising:
reconciling high level file system metadata within a persistent memory file system of the remote partition.

11. A computing device comprising:
a memory comprising machine executable code; and
a processor coupled to the memory, the processor configured to execute the machine executable code to cause the computing device to:
mirror data between a first persistent memory of a first node and a second persistent memory of a second node,
wherein data within a local partition of the first persistent memory is mirrored to a remote partition of the second persistent memory;
perform a takeover sequence by the first node to take over processing of client I/O in place of the second node in response to the second node failing;
executing a scanner to traverse a file system tree of the remote partition to fix global inconsistencies; and
in response to receiving a client I/O operation directed to a page within the persistent memory, executing the scanner on-demand upon the file system tree in relation to page and in-line with executing the client I/O operation based upon a determination that the scanner has not yet traversed the page.

12. The computing device of claim 11, wherein the machine executable code causes the computing device to:
reconcile high level file system metadata within a persistent memory file system of the remote partition while client access to the persistent memory file system is inaccessible until reconciliation of the high level file system metadata has completed.

13. The computing device of claim 12, wherein the machine executable code causes the computing device to:
execute a first scanner to traverse pages of the remote partition to fix local inconsistencies associated with the pages.

14. The computing device of claim 13, wherein the first scanner is executed asynchronously with respect to processing the client I/O directed to the persistent memory file system of the remote partition.

15. The computing device of claim 13, wherein the machine executable code causes the computing device to:
process the client I/O operation based upon a determination that the scanner and the first scanner have traversed the page.

16. The computing device of claim 11, wherein the scanner is executed asynchronously in parallel with processing the client I/O directed to the persistent memory file system of the remote partition.

17. A non-transitory machine readable medium comprising instructions, which when executed by a machine, causes the machine to:
mirror data between a first persistent memory of a first node and a second persistent memory of a second node,
wherein data within a local partition of the first persistent memory is mirrored to a remote partition of the second persistent memory;
perform a takeover sequence by the first node to take over processing of client I/O in place of the second node in response to the second node failing;
execute a scanner to traverse a file system tree of the remote partition to fix global inconsistencies; and
in response to receiving a client I/O operation directed to a page within the persistent memory, execute the scanner on-demand upon the file system tree in relation to the page and in-line with executing the client I/O operation based upon a determination that the scanner has not yet traversed the page.

18. The non-transitory machine readable medium of claim 17, wherein the takeover sequence comprises:
reconciling high level file system metadata within a persistent memory file system of the remote partition while client access to the persistent memory file system is inaccessible until reconciliation of the high level file system metadata has completed.

19. The non-transitory machine readable medium of claim 18, wherein the takeover sequence comprises:
executing a first scanner to traverse pages of the remote partition to fix local inconsistencies associated with the pages.

20. The non-transitory machine readable medium of claim 19, wherein the first scanner is executed asynchronously with respect to processing the client I/O directed to the persistent memory file system of the remote partition.

* * * * *